United States Patent

Norota et al.

[11] Patent Number: 4,730,587
[45] Date of Patent: Mar. 15, 1988

[54] CONTROL DEVICE OF AN INTERNAL COMBUSTION ENGINE

[76] Inventors: Kazuhiko Norota, 2-56, Ekakushin-cho; Takashi Hattori, 3-39-2, Hirashiba-cho; Nobuyuki Kobayashi, 6-63, Takami-cho, all of Toyota-shi, Aichi-ken, Japan

[21] Appl. No.: 52,114

[22] Filed: Apr. 24, 1987

Related U.S. Application Data

[63] Continuation of Ser. No. 730,206, May 3, 1985, abandoned.

[30] Foreign Application Priority Data

May 7, 1984 [JP] Japan ................................. 59-91593

[51] Int. Cl.⁴ .............................................. F02P 5/00
[52] U.S. Cl. .................................. 123/416; 123/417; 123/423; 123/493
[58] Field of Search ............... 123/493, 416, 478, 423, 123/480, 438, 493, 415, 417, 329; 74/872

[56] References Cited

U.S. PATENT DOCUMENTS

| | | | |
|---|---|---|---|
| 3,547,089 | 12/1970 | Pierlot | 123/423 |
| 3,596,644 | 8/1971 | Hutchins | 123/423 |
| 4,191,145 | 3/1980 | Fowler | 123/415 |
| 4,257,363 | 3/1981 | Zeller | 123/493 |
| 4,479,186 | 10/1984 | Takao et al. | 123/417 |
| 4,480,621 | 11/1984 | Hoppel et al. | 123/493 |
| 4,485,775 | 12/1984 | Kanada et al. | 123/88 |
| 4,503,822 | 3/1985 | Kobayashi et al. | 123/493 |
| 4,527,521 | 7/1985 | Hasegawa et al. | 123/493 |
| 4,532,902 | 8/1985 | Mizuno et al. | 123/417 |

Primary Examiner—Raymond A. Nelli
Attorney, Agent, or Firm—Cushman, Darby and Cushman

[57] ABSTRACT

An engine having a fuel injector for normally feeding a lean air-fuel mixture into the engine cylinders. Ignition timing is determined so that it is suitable for the lean air-fuel mixture. The gear changing operation of the transmission of the engine is detected from the change in the engine speed and the change in the absolute pressure in the intake passage. When the gear changing operation is carried out, a rich air-fuel mixture is fed into the engine cylinders, and the ignition timing is retarded.

11 Claims, 18 Drawing Figures

CONTROL DEVICE OF AN INTERNAL COMBUSTION ENGINE

This is a continuation of application Ser. No. 730,206, filed May 3, 1985, which was abandoned upon the filing hereof.

BACKGROUND OF THE INVENTION

1. Field of the Invention

The present invention relates to a control device of an internal combustion engine.

2. Description of the Related Art

U.S. Pat. No. 4,485,775 discloses an engine having a helically-shaped intake port, which can create a strong swirl motion in the combustion chamber when the engine is operating at a low speed and obtain a high volumetric efficiency when the engine is operating at a high speed. This helically-shaped intake port includes a helical portion, an inlet passage portion tangentially connected to the helical portion, and a bypass passage connecting the inlet passage portion to the helix terminating portion of the helical portion. A swirl control valve is arranged in the bypass passage.

In this engine, when the engine is operating at a low speed, the swirl control valve closes the bypass passage. As a result, the entire volume of air flows into the helical portion from the inlet passage portion of the intake port, and thus a strong swirl motion is created in the combustion chamber. As mentioned above, in this engine, since it is possible to create a strong swirl motion in the combustion chamber by closing the swirl control valve, a stable combustion can be obtained even if an extremely lean air-fuel mixture is used.

However, where such an extremely lean air-fuel mixture is used, for example when a gear changing operation in the engine transmission is carried out, a satisfactory increase in the output torque of the engine cannot be obtained. That is, when the gear changing operation is carried out, first, the accelerator pedal is released, second, the position of the transmission gear is manually changed and, finally, the accelerator pedal is depressed. At this time, where an extremely lean air-fuel mixture is used, a satisfactory increase in the output torque of the engine cannot be obtained. This unsatisfactory increase in the output torque of the engine causes the driver to feel that insufficient power is available for driving the motor vehicle, and thus a problem occurs in that good drivability cannot be obtained.

SUMMARY OF THE INVENTION

An object of the present invention is to provide a control device for an internal combustion engine capable of obtaining good drivability when transmission gear changing operations are carried out.

According to the present invention, there is provided a control device for an internal combustion engine having a transmission, an intake passage and a spark plug arranged in a combustion chamber. The control device includes a fuel supply device arranged in the intake passage for feeding fuel into the intake passage; a discriminating device for discriminating whether a gear changing operation of the transmission is carried out, and for producing an output signal indicating that the gear changing operation is carried out; a fuel supply control device connected to the fuel supply device and controlled in response to the output signal from the discriminating device for normally forming a lean air-fuel mixture in the intake passage and for temporarily forming a rich air-fuel mixture in the intake passage when the gear changing operation is carried out; and, an ignition timing control device connected to the spark plug and controlled in response to the output signal from the discriminating device for normally causing ignition at a predetermined basic ignition timing and for temporarily retarding the ignition timing relative to the basic ignition timing when the gear changing operation is carried out.

BRIEF DESCRIPTION OF THE DRAWINGS

The present invention may be more fully understood from the description of a preferred embodiment of the invention set forth below, together with the accompanying drawings, in which.

DESCRIPTION OF THE PREFERRED EMBODIMENT

Figure 1:
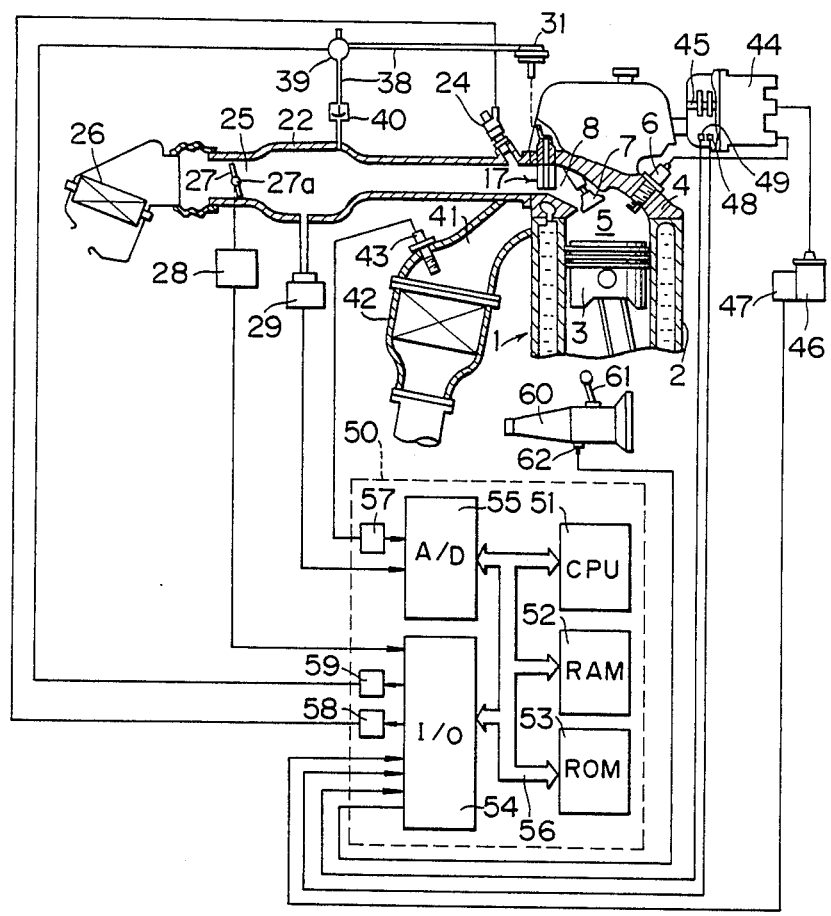
FIG. 1 is a cross-sectional side view of an entire engine.
Figure 2:
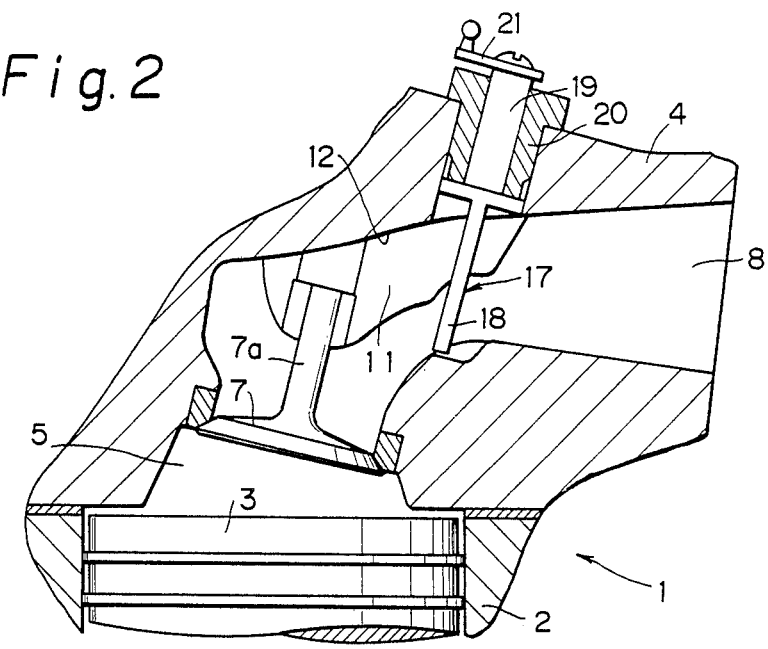
FIG. 2 is a cross-sectional side view of the cylinder head.
Figure 3:
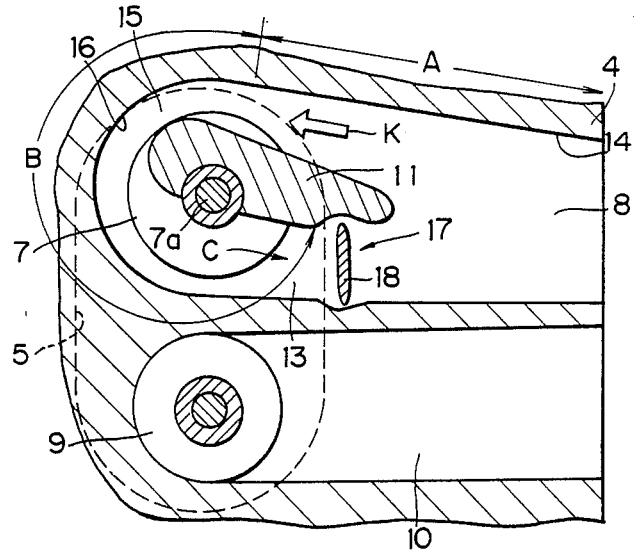
FIG. 3 is a cross-sectional plan view of the cylinder head.
Figure 4:
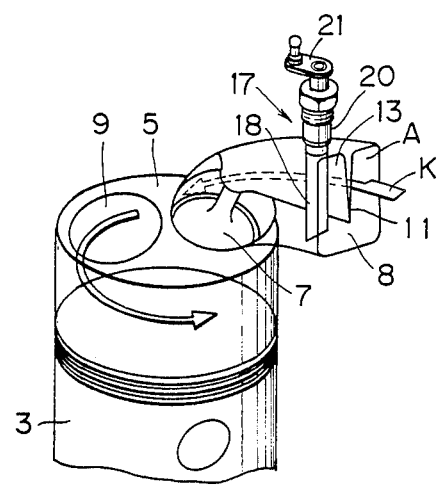
FIG. 4 is a schematically illustrated perspective view of the engine.

Referring to FIGS. 1 through 4, reference numeral 1 designates an engine body, 2 a cylinder block, 3 a piston reciprocally movable in the cylinder block 2, and 4 a cylinder head fixed onto the cylinder block 2; 5 designates a combustion chamber, 6 a spark plug arranged in the combustion chamber 5, 7 an intake valve, and 8 a helically-shaped intake port; 9 designates an exhaust valve, and 10 an exhaust port. A downwardly projecting separating wall 11 is formed on the upper wall 12 of the intake port 8, and a space is formed between the lower face of the separating wall 11 and the bottom wall of the intake port 8. This separating wall 11 passes the side of the valve stem 7a and extends along the axis of the intake port 8. An inlet passage portion A, a helical portion B, and a bypass passage 13 are formed in the intake port 8 by the separating wall 11. The inlet passage portion A is tangentially connected to the helical portion B, and the bypass passage 13 is branched from the inlet passage portion A and connected to the helix terminating portion C of the helical portion B. As illustrated in FIG. 3, the transverse width of the inlet passage portion A formed between the side wall 14 of the intake port 8 and the separating wall 11 decreases toward the helical portion B, and a narrow passage portion 15 is formed between the cylindrical side wall 16 of the helical portion B and the separating wall 11. A swirl control valve 17 is arranged in the bypass passage 13. This swirl control valve 17 includes a thin walled valve body 18 and a valve shaft 19; the valve shaft 19 being rotatably supported by a valve holder 20 fixed onto the cylinder head 4. As illustrated in FIG. 2, an arm 21 is fixed onto the upper end of the valve shaft 19.

As illustrated in FIG. 1, the intake port 8 is connected to a surge tank 22 via a branch pipe 23, and a fuel injector 24 is arranged in the branch pipe 23. This fuel injector 24 is connected to the fuel pump (not shown) driven by the engine. The surge tank 22 is connected to the outside air via an intake air duct 25 and an air filter element 26, and a throttle valve 27 actuated in response to the depression of the accelerator pedal (not shown) is arranged in the intake air duct 26. A throttle switch 28 is connected to the valve shaft 27a of the throttle valve 27 and is turned ON when the degree of opening of the throttle valve 27 exceeds a predetermined degree, for example, 20 degrees through 30 degrees. The throttle switch 28 is connected to an electronic control unit 50.

A vacuum sensor 29 is attached to the surge tank 22 and produces an output voltage which is proportional to the absolute pressure produced in the surge tank 22. This vacuum sensor 29 is connected to the electronic control unit 50.

Figure 5:
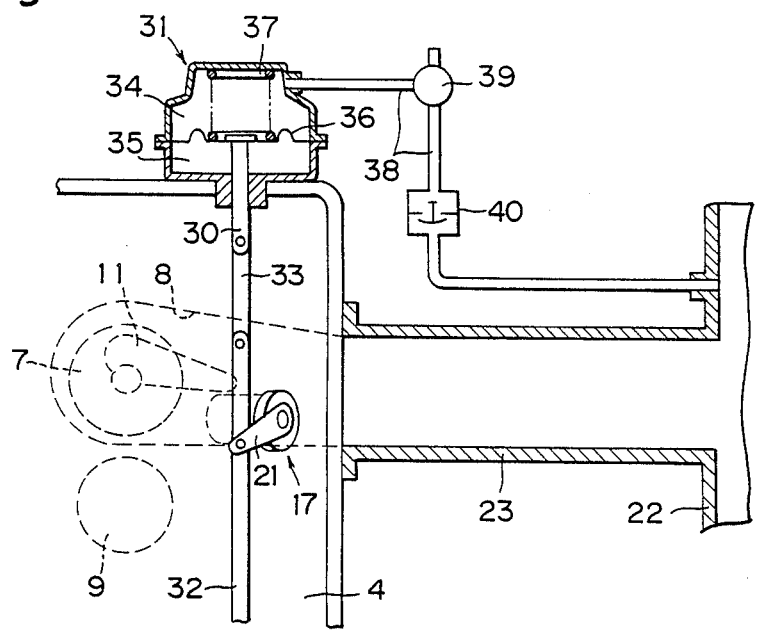
FIG. 5 is a plan view, partly in cross-section, of a portion of the cylinder head.

As illustrated in FIGS. 1 and 5, the arm 21 of the swirl control valve 17 is connected to a control rod 30 of an actuator 31 via a connecting rod 32 and a link member 33. The actuator 31 includes a vacuum chamber 34 and an atmospheric pressure chamber 35, which chambers are separated by a diaphragm 36. The control rod 30 is connected to the diaphragm 36, and a compression spring 37 for biasing the diaphragm is arranged in the vacuum chamber 34. The vacuum chamber 34 is connected to the surge tank 22 via a conduit 38. A solenoid valve 39, which can be opened to the outside air, is arranged in the conduit 38, and a check valve 40, which permits only the outflow of air from the vacuum chamber 34 to the surge tank 22, is arranged in the conduit 22. The solenoid valve 39 is connected to the electronic control unit 50 and is controlled in response to the output signal of the electronic control unit 50.

When the vacuum chamber 34 of the actuator 31 is connected to the surge tank 22 via the solenoid valve 39, a vacuum acts in the vacuum chamber 34. At this time, the check valve 40 opens only when the level of vacuum in the surge tank 22 is greater than that of vacuum in the vacuum chamber 34. Consequently, the level of vacuum in the vacuum chamber 34 is maintained at the maximum vacuum produced in the surge tank 22. When the level of vacuum in the vacuum chamber 34 exceeds a predetermined level, the diaphragm 36 moves toward the vacuum chamber 34 and, as a result, the swirl control valve 17 closes the bypass passage 13, as illustrated in FIG. 3. At this time, air introduced into the inlet passage portion A of the intake port 8 flows into the helical portion B, as illustrated by the arrow K in FIGS. 3 and 4. Consequently, since the inlet passage portion A is formed in such a manner that the transverse width thereof decreases toward the helical portion B, as mentioned above, the velocity of the air is increased. The air then flows along the cylindrical side wall 16 of the helical portion B, and thus a strong swirl motion is created.

When the vacuum chamber 34 of the actuator 31 is opened to the outside air via the solenoid valve 39, the diaphragm 36 is moved toward the atmospheric pressure chamber 35 by the spring force of the compression spring 37. As a result, the swirl control valve 17 opens the bypass passage 13. Consequently, part of the air flows into the helical portion B via the bypass passage 13 having a small flow resistance. This part of the air comes into head-on collision with the air stream swirling along the cylindrical side wall 16 of the helical portion B, and thus the swirl motion is weakened. As mentioned above, when the swirl control valve 17 is open to the maximum extent, the swirl motion is weakened and, in addition, the flow area of the intake port 8 is increased. As a result, a high volumetric efficiency can be obtained.

Figure 6:
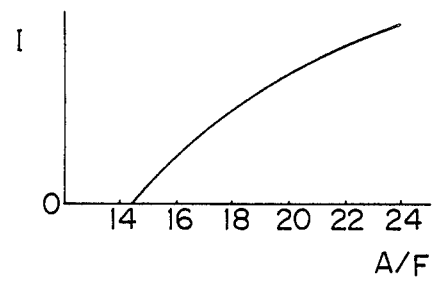
FIG. 6 is a diagram illustrating the output current of a lean sensor.

Referring to FIG. 1, an exhaust manifold 41 is connected to the exhaust port 10 (FIG. 3), and a catalytic converter 42 containing a catalyzer therein is connected to the exhaust manifold 41. Hydrocarbons (HC), carbon-monoxide (CO), and nitrogen-oxides (NOx) are purified in the catalytic converter 42. A lean sensor 43 is arranged in the exhaust manifold 41 and connected to the electronic control unit 50. The lean sensor 43 produces an output current proportional to the oxygen concentration in the exhaust gas, as illustrated in FIG. 6. In FIG. 6, the ordinate indicates the output current I of the lean sensor 43, and the abscissa indicates the air-fuel ratio (A/F). The construction and the operation of the lean sensor 43 is known in, for example, Japanese Unexamined Patent Publication (Kokai) No. 58-143108 and, therefore, a description of the construction and the operation of the lean sensor 43 is omitted.

As illustrated in FIG. 1, the engine 1 is equipped with a distributor 44 having a rotor 45 driven by the engine 1. The distributor 44 is connected to the electronic control unit 50 via an ignition coil 46 and an igniter 47. The electronic control unit 50 produces an ignition signal. This ignition signal is fed into the igniter 47 and then the primary current of the ignition coil 46 is controlled by the ignition signal. The high voltage produced in the ignition coil 46 is applied to the spark plug 6 of each cylinder via the distributor 44, and thus the spark plug 6 produces a spark at a time determined by the ignition signal. A pair of crank angle sensors 48, 49 are arranged in the distributor 44 and connected to the electronic control unit 50. The crank angle sensor 48 produces an output pulse every time the crank shaft of the engine 1 rotates by 30 degrees, and the crank angle sensor 49 produces an output pulse every time the crankshaft of the engine 1 rotates by 720 degrees.

The engine 1 is equipped with a transmission 60 having a manual shift lever 61, and a vehicle speed sensor 62 is mounted on the transmission 60. This vehicle speed sensor 62 is connected to the electronic control unit 50 and produces an output pulse every time the wheels of the motor vehicle rotate by a predetermined angle. Consequently, it is possible to calculate the vehicle speed from the output pulse of the vehicle speed sensor 62.

The electronic control unit 50 is constructed as a digital computer and includes a control processing unit (CPU) 51 carrying out the arithmetic and logic processing, a random-access memory (RAM) 52, a read-only memory (ROM) 53 storing a predetermined control program and arithmetic constant therein, an input/output (I/O) port 54, and an analog-digital (A/D) converter 55 incorporating a multiplexer. The CPU 51, the RAM 52, the ROM 53, the I/O port 54, and the A/D converter 55 are interconnected to each other via a bidirectional bus 56. A throttle switch 28 is connected to the I/O port 54, and the output signal of the throttle switch 28 is input to the I/O port 54. The vacuum sensor 29 is connected to the A/D converter 55, and the output signal of the vacuum sensor 29 is input to the A/D converter 55. The lean sensor 43 is connected to the A/D converter 55 via a current-voltage converting circuit 57 of the electronic control unit 50. The output current of the lean sensor 43 is converted to a corresponding voltage in the current-voltage converting circuit 57, and the voltage thus converted is then input to the A/D converter 55. In the A/D converter 55, the output voltage of the vacuum sensor 29 or the output voltage of the current-voltage converting circuit 57 is selectively converted to a corresponding binary code in response to an indication signal issued from the CPU 51. The binary code thus obtained, that is, data representing the absolute pressure PM in the surge tank 22 and data corresponding to the output current LNSR of the lean sensor 42, are stored in the RAM 52.

The crank angle sensors 48 and 49 are connected to the I/O port 54, and the output pulses of the crank angle sensors 48 and 49 are input to the I/O port 54. These output pulses are then input to the CPU 51 and the engine speed NE, for example, is calculated by measuring the number of output pulses which the crank angle sensor 48 produces per unit time. The engine speed NE thus calculated is stored in the RAM 52. In addition, the vehicle speed sensor 62 is connected to the I/O port 54, and the output pulse of the vehicle speed sensor 62 is input to the I/O port 54.

The fuel injector 24 and the solenoid valve 39 are connected to the I/O port 54 via corresponding drive circuits 58 and 59, and the igniter 47 is connected to the I/O port 54. An injection signal is fed into the fuel injector 24 from the CPU 51 via the I/O port 54 and the drive circuit 58. The solenoid of the fuel injector 24 is energized for a time period determined by the injection signal, and thus fuel is intermittently injected from the fuel injector 24 into the intake port 8. A swirl control drive signal is fed into the solenoid valve 39 from the CPU 51 via the I/O port 54 and the drive circuit 59. The solenoid valve 39 is energized for a time period determined by the swirl control drive signal. As mentioned previously, the ignition signal is fed into the igniter 47 from the CPU 51 via the I/O port 54.

In the engine according to the present invention, three kinds of air-fuel mixtures, that is, an extremely lean air-fuel mixture (for example, an air-fuel ratio of about 22:1), a relatively lean air-fuel mixture (for example, an air-fuel ratio of 17:1 to 18:1), and an air-fuel mixture having an approximately stoichiometric air-fuel ratio are basically used. Roughly speaking, when the engine is operating at a high speed, the air-fuel mixture of an approximately stoichiometric air-fuel ratio is fed into the engine cylinders. When the engine is operating at a low speed, the extremely lean air-fuel mixture or the relatively lean air-fuel mixture is fed into the engine cylinders. At this time, the position of the throttle valve 27 determines whether the extremely lean air-fuel mixture or the relatively lean air-fuel mixture should be fed into the cylinders. That is, when the throttle switch 28 is turned ON, i.e., when the degree of opening of the throttle valve 27 exceeds a predetermined degree, for example, 20 degrees to 30 degrees, the relatively lean air-fuel mixture is fed into the cylinders. Contrary to this, when the throttle switch 28 is turned OFF, that is, when the degree of opening of the throttle valve 27 becomes smaller than the predetermined degree, the extremely lean air-fuel mixture is fed into the cylinders. In addition, when the air-fuel mixture of an approximately stoichiometric air-fuel ratio is fed into the cylinders, the swirl control valve 17 is opened to the maximum extent and, when the extremely lean air-fuel mixture or the relatively lean air-fuel mixture is fed into the cylinders, the swirl control valve 17 is closed. If the swirl control valve 17 is closed, a strong swirl motion is created in the combustion chamber 5 and, as a result, the burning velocity is increased. Consequently, at this time, even if the lean air-fuel mixture is fed into the cylinders, stable combustion can be obtained. The above-mentioned operation is a basic operation.

In the present invention, as hereinafter described, when the gear changing operation is carried out, a rich air-fuel mixture is fed into the engine cylinders and, at the same time, the ignition timing is retarded.

Figure 7:
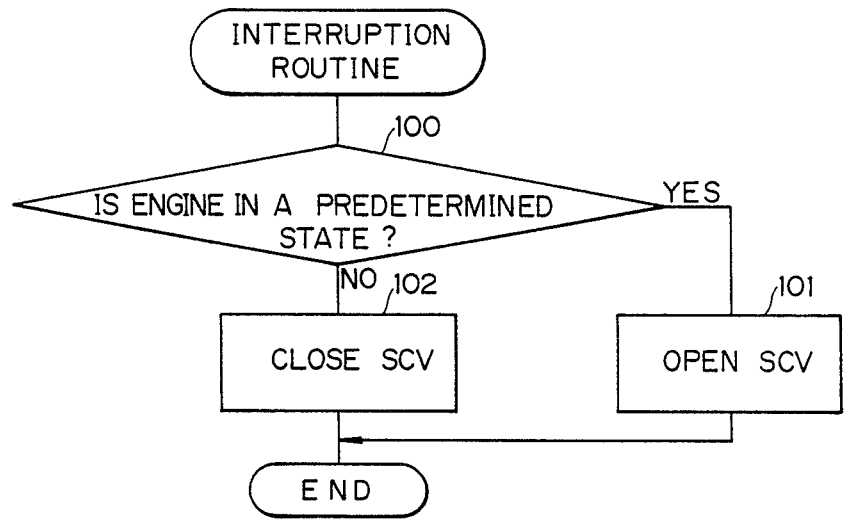
FIG. 7 is a flow chart for controlling an opening operation of a swirl control valve.

Initially, the control of the swirl control valve 17 will be described with reference to FIG. 7. FIG. 7 illustrates the processing routine which electronic circuit unit 50 uses for controlling the swirl control valve 17. This routine is processed by sequential interruptions executed at predetermined time intervals. Referring to FIG. 7, initially, at step 100, it is judged whether the engine is in a predetermined state in which the swirl control valve 17 should be opened. This predetermined state is as follows.

(1) when the engine speed is higher than 2800 rpm;
(2) when the throttle valve 27 is opened to the maximum extent;
(3) when the starting operation of the engine is carried out.

When at least one of the above states (1), (2), and (3) is satisfied, the routine goes to step 101. At step 101, the solenoid valve 39 is energized, and the vacuum chamber 34 of the actuator 31 is caused to open to the outside air. As a result, the swirl control valve (SCV) 17 is opened to the maximum extent. When the engine is not in a predetermined state in which the swirl control valve 17 should be opened, the routine goes to step 102. At step 102, the solenoid valve 39 is deenergized. As a result, the vacuum chamber 34 of the actuator 31 is connected to the surge tank 22, and thus the swirl control valve (SCV) 17 is closed.

Figure 8:
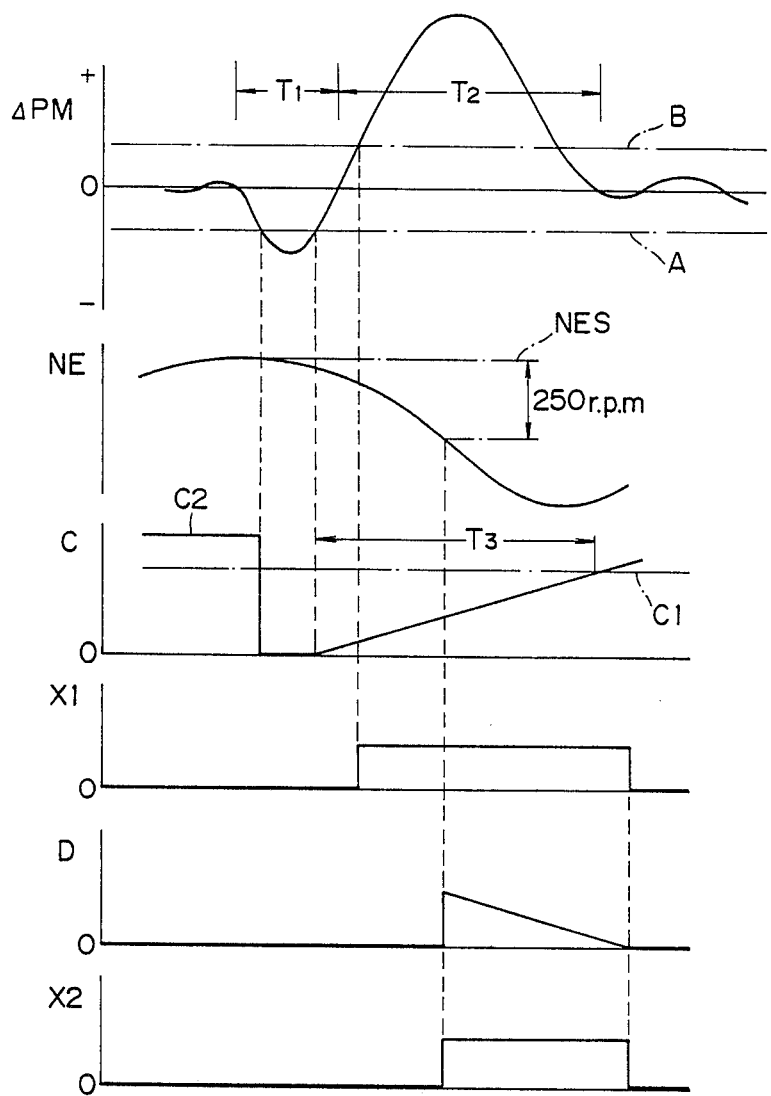
FIG. 8 is a timing chart illustrating the degree of change in absolute pressure and changes in engine speed, the count value of an upcounter, the count value of a downcounter, and flags.

FIG. 8 illustrates the degree of change $\Delta PM$ in the absolute pressure PM in the surge tank 22, the engine speed NE, the count value of the upcounter C used in the flow charts hereinafter described, the flag X1 used in the flow charts hereinafter described, the count value of the downcounter D used in the flow charts hereinafter described, and the flag X2 used in the flow charts hereinafter described.

In the present invention, it is determined from the change in the engine speed NE and the degree of change ΔPM in the absolute pressure PM whether or not the gear changing operation of the transmission 60 is carried out. That is, when the gear changing operation is carried out, initially, the accelerator pedal is released. As a result, ΔPM temporarily decreases, and the engine speed NE becomes low. Then, since the accelerator pedal is depressed, ΔPM increases, and the engine speed NE gradually becomes high. Of course, when the depression of the accelerator pedal is decreased and then increased without carrying out the gear changing operation, the engine speed NE temporarily becomes low. However, at this time, the engine speed NE is gradually reduced. Consequently, it is determined whether the gear changing operation is carried out by judging whether or not the following states are satisfied.

(1) whether ΔPM decreases and then increases.
(2) whether the engine speed NE decreases by a predetermined speed within a predetermined time period after ΔPM increases.

That is, if ΔPM decreases and then increases, and if the engine speed NE decreases by a predetermined speed within a predetermined time period after ΔPM increases, it is considered that a gear changing operation is being carried out.

Consequently, in the present invention, as illustrated in FIG. 8, when ΔPM decreases below a predetermined lower level (−A), the increment of the upcounter C is started. Subsequently, when ΔPM increases beyond a predetermined upper level (B), the flag X1 is set. Where the engine speed NE decreases by a predetermined speed (250 r.p.m.) before a predetermined time T3 is elapsed, that is, before the count value of the upcounter C exceeds a predetermined lower level (C1), the flag X2 is set. That is, when it is determined that the gear changing operation is being carried out, the flag X2 is set. At this time, the air-fuel mixture fed into the engine cylinders is changed from a lean air-fuel mixture to a rich air-fuel mixture and, at the same time, the ignition timing is retarded as hereinafter described. Subsequently, during the time the flag X2 is set, a rich air-fuel mixture is fed into the engine cylinder, and the ignition timing remains retarded.

Figure 9:
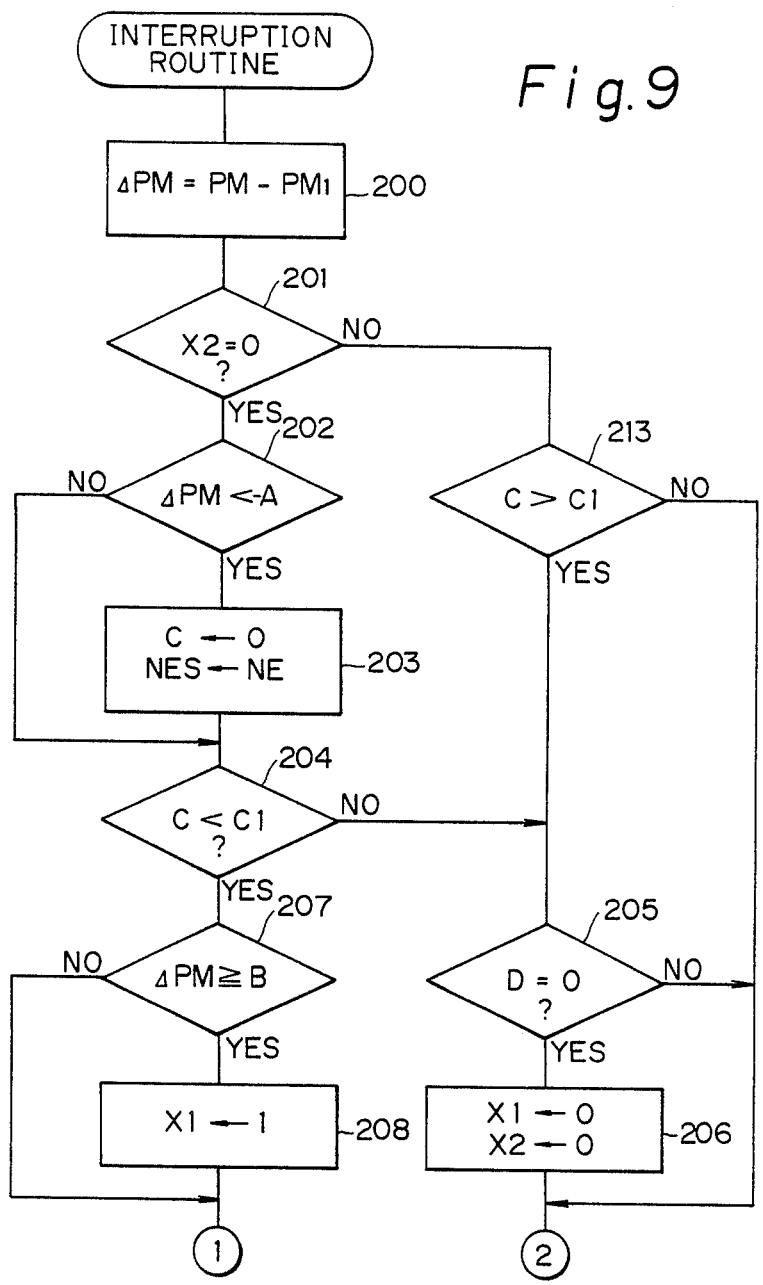
FIGS. 9 and 10 are a flow chart for selectively setting or resetting the flags.
Figure 10:
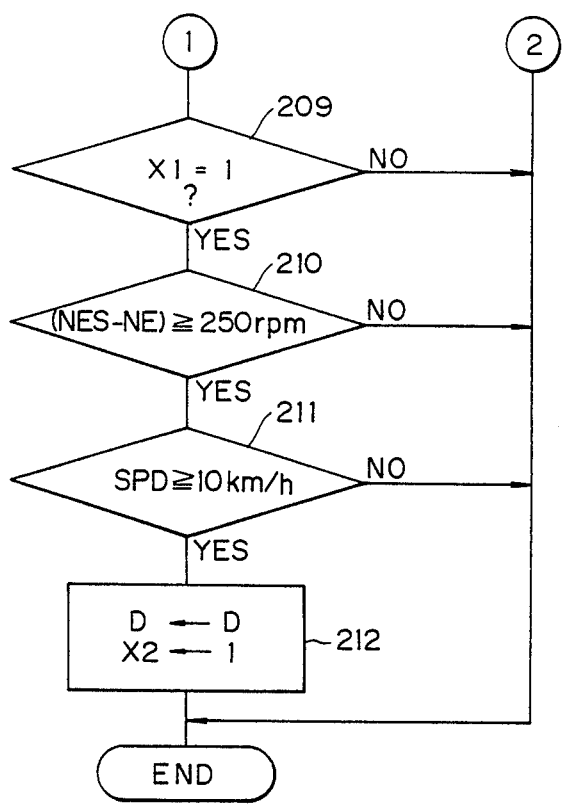

FIGS. 9 and 10 illustrate a processing routine for setting or resetting the flag X2 by judging whether or not the gear changing operation has been carried out. This routine is processed by sequential interruptions executed at predetermined time intervals, for example, 12 msec.

Referring to FIGS. 9 and 10, initially, in step 200, the degree of change ΔPM in the absolute pressure PM in the surge tank 22 is calculated by subtracting the absolute pressure $PM_1$, detected in the preceding processing cycle and stored in the RAM 52, from the present absolute pressure PM. The routine then goes to step 201, and it is determined whether the flag X2 is zero, that is, the flag X2 is reset. As the flag X2 is normally reset, the routine usually goes to step 202. In step 202, it is determined whether ΔPM is lower than a predetermined lower level (−A), for example, −39 mmHg. If ΔPM < −A, the routine goes to step 203 and, if ΔPM ≧ −A, the routine jumps to step 204. As ΔPM is normally larger than −A, the routine usually jumps to step 204. In step 204, it is determined whether the count value of the upcounter C is smaller than a predetermined lower level C1. As mentioned hereinafter, the count value C is normally maintained at a predetermined upper level C2 (FIG. 8) which is larger than C1. Consequently, in step 204, it is determined that C is larger than C1, and the routine goes to step 205. In step 205, it is determined whether the count value of the downcounter D is equal to zero. As mentioned hereinafter, the count value D is normally maintained at zero. Consequently, the routine normally goes to step 206. In step 206, zero is put into the flags X1 and X2, that is, the flags X1 and X2 are reset, and the processing cycle is then completed.

In FIG. 8, the time $T_1$ indicates the case where pressure on the accelerator pedal is released in order to carry out the gear changing operation. At this time, if ΔPM decreases below the lower level (−A), it is determined in step 202 of FIG. 9 that ΔPM is lower than −A, and thus the routine goes to step 203. In step 203, zero is put into the count value C, and the engine speed NE is made to NES. This NES indicates the engine speed NE at the moment when ΔPM decreases below the lower level (−A). The routine then goes to step 204. In step 204, it is determined that the count value C (=0) is smaller than the lower level C1 and the routine goes to step 207. In step 207, it is determined whether ΔPM is larger than or equal to a predetermined upper level B, for example, 19.5 mmHg. If ΔPM ≧ B, the routine goes to step 208, and 1 is put into the flag X1, that is, the flag X1 is set. If ΔPM < B, the routine jumps to step 209. When ΔPM decreases below the lower level (−A), since ΔPM is smaller than the upper level B, the routine jumps to step 209 from step 207. At step 209, it is determined whether the flag X1 is set. At this time, since the flag X1 remains reset, the processing routine is completed.

Figure 11:
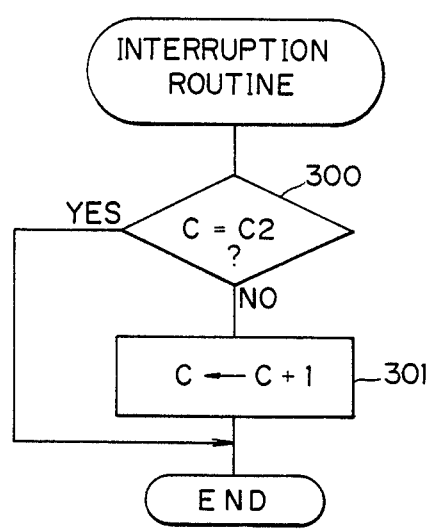
FIG. 11 is a flow chart for incrementing the count value of the upcounter.

The increment of the count value C is carried out in a separate processing routine illustrated in FIG. 11. This routine is processed by sequential interruptions executed at predetermined time intervals, for example, 32 msec. Referring to FIG. 11, initially, in step 300, it is determined whether the count value of the upcounter C is equal to a predetermined upper level C2, which is larger than the lower level C1 (FIG. 8). If the count value C is not equal to C2, the routine goes to step 301, and the count value C is incremented by 1. If C=C2, the processing cycle is completed. Consequently, when the count value C is equal to C2, the countup operation is stopped.

Returning to FIG. 9, in step 203, zero is put into the count value C as long as ΔPM is smaller than (−A). Consequently, the count of the upcounter C is not started as long as ΔPM is smaller than (−A). Then, if ΔPM becomes equal to or larger than (−A), the routine jumps to step 204 from step 202, and the count operation of the upcounter C is started as illustrated in FIG. 8. This count operation continues until the countup value C becomes equal to the upper level C2. When the count value C becomes equal to C2, the countup operation is stopped, as mentioned above, and the count value C is then maintained at the upper level C2.

In FIG. 8, the time $T_2$ indicates the case where the accelerator pedal is depressed again after it has been released. In time $T_2$, if ΔPM exceeds the upper level B, the routine goes to step 208 from step 207 in FIG. 9, and the flag X1 is set. Consequently, at this time, the routine goes to step 210 via step 209. In step 210, it is determined whether (NES-NE) is equal to or larger than 250 r.p.m. NES indicates the engine speed obtained in step 203, and NE indicates the present engine speed. Consequently, it is determined in step 210 whether the engine speed NE has decreased by 250 r.p.m., as compared with the engine speed NES. If NE has not decreased by 250 r.p.m., the processing routine is completed. If NE has decreased by 250 r.p.m., the routine goes to step 211. At step 211, it is determined whether the vehicle speed SPD is equal to or larger than 10 km/h. If SPD < 10 km/h, the processing cycle is completed. If SPD ≧ 10 km/h, the routine goes to step 212. At step 212, a fixed value D is put into the downcounter and, at the same time, the flag X2 is set. Step 211 is provided to ensure that the flag X2 is not set when the engine is raced.

Figure 12:
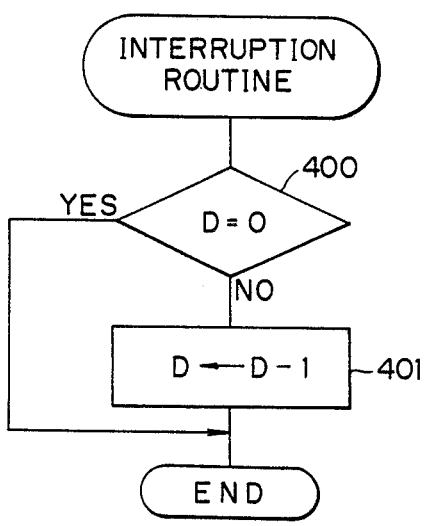
FIG. 12 is a flow chart for decrementing the count value of the downcounter.

The decrement of the count value D is carried out in a separate processing routine illustrated in FIG. 12. This routine is processed by sequential interruptions executed every time the hereinafter described processing for calculating the fuel injection pulse width is carried out. Referring to FIG. 12, initially, in step 400, it is determined whether the count value D is equal to zero. If D=0, the processing routine is completed. If D is not equal to zero, the routine goes to step 401, and the count value D is decremented by 1. Consequently, as illustrated in FIG. 8, the count value D is gradually decremented after the flag X2 is set.

If the flag X2 is set, the routine goes to step 213 from step 201 in FIG. 9. At step 213, it is determined whether the count value of the upcounter C is larger than the lower level C1. If C ≦ C1, the processing routine is completed and the flag X2 remains set. When a time $T_3$ (FIG. 8) has elapsed after the count up operation is started, the count value C becomes equal to C1. The time $T_3$ is about 2 sec.

If it is determined in step 213 that C is larger than C1, the routine goes to step 205 and it is determined that the count value D of the downcounter is equal to zero. If D is not equal to zero, the processing routine is completed and thus, at this time, the flag X2 remains set. If D=0, the routine goes to step 206, and the flags X1 and X2 are reset. Consequently, it can be understood that when the count value D becomes equal to zero after C exceeds C1, the flag X2 is reset.

Figure 13:
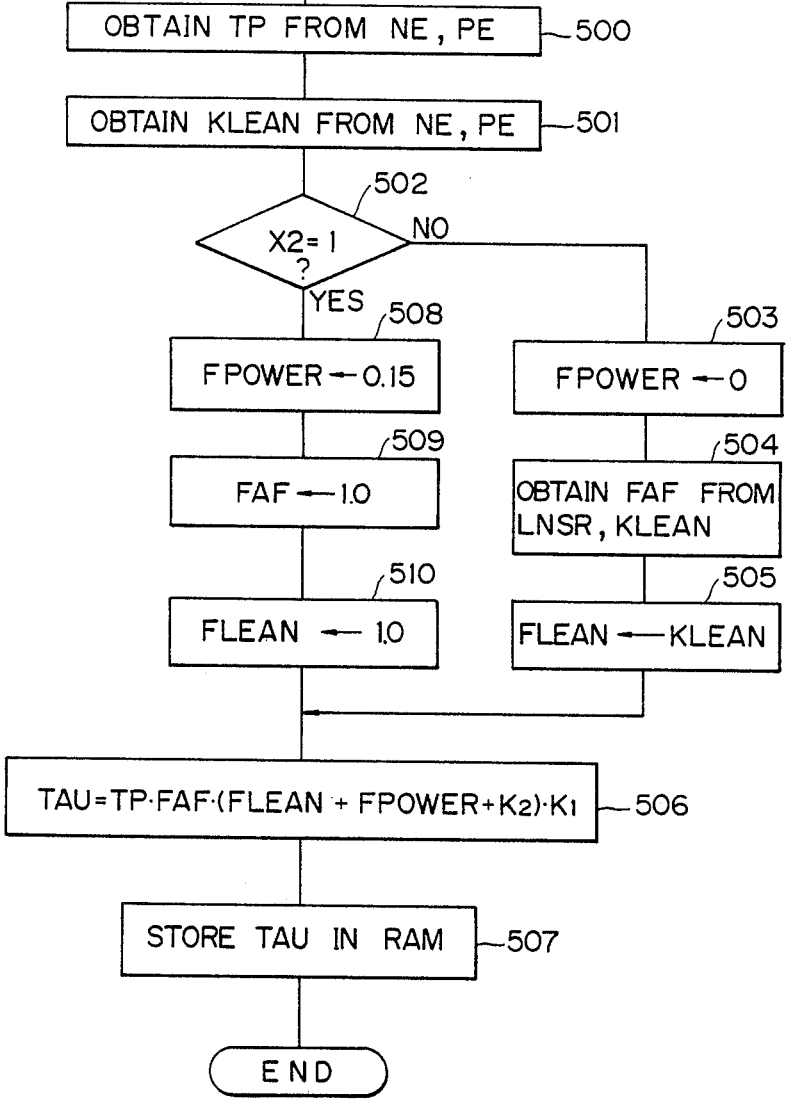
FIG. 13 is a flow chart for calculating a fuel injection pulse width.
Figure 16:
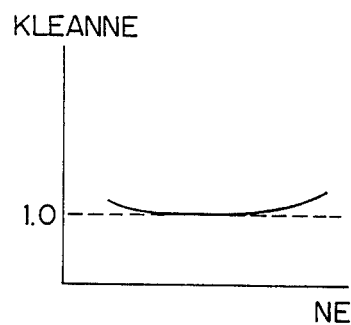
FIG. 16 is a diagram illustrating the relationship between a correction coefficient KLEANNE and the engine speed.
Figure 17:
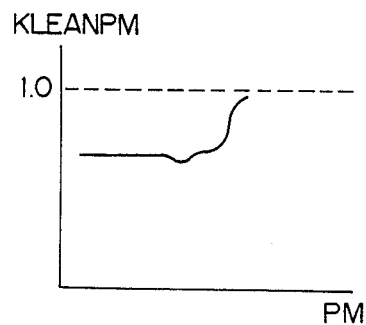
FIG. 17 is a diagram illustrating a relationship between a correction coefficient KLEANPM and the absolute pressure in the surge tank.

FIG. 13 illustrates a processing routine for calculating the injection pulse width TAU on the basis of the flag X2. This routine is executed in a main routine every time the crankshaft rotates by a predetermined angle, for example, 180 degrees. Referring to FIG. 13, at step 500, the basic pulse width TP of the injection signal is obtained from the engine speed NE and the absolute pressure PM. Data indicating the relationship among the basic pulse width TP, the engine speed NE, and the absolute pressure PM is stored in the ROM 53 in the form of a data table. Thus, at step 500, the basic pulse width TP is obtained from the data stored in the ROM 53. Then, at step 501, KLEAN is obtained from the engine speed NE and the absolute pressure PM. That is, data indicating the relationship between KLEANNE and the engine speed NE as illustrated in FIG. 16 is stored in the ROM 53, and data indicating the relationship between KLEANPM and the absolute pressure PM as illustrated in FIG. 17 is stored in the ROM 53. At step 501, KLEANNE is multiplied by KLEANPM and thus KLEAN (=KLEANNE·KLEANPM) is obtained. This KLEAN is a correction coefficient used for changing the desired air-fuel ratio to an air-fuel ratio which is on the lean side of the stoichiometric air-fuel ratio.

Then, in step 502, it is determined whether the flag X2 is set, that is, the gear changing operation is carried out. If the flag X2 is reset, that is, the gear changing operation is not carried out, the routine goes to step 503. In step 503, zero is put into the power correction coefficient FPOWER. This FPOWER is used for the enrichment of the air-fuel mixture. Then the routine goes to step 504, and FAF is obtained from the output value LNSR of the lean sensor 43 and the lean correction coefficient KLEAN. FAF is a correction coefficient used for carrying out the closed loop control of the air-fuel ratio. FAF is calculated in the processing routine illustrated in FIG. 14. When open loop control of the air-fuel ratio is carried out, FAF is maintained at 1.0.

Figure 14:
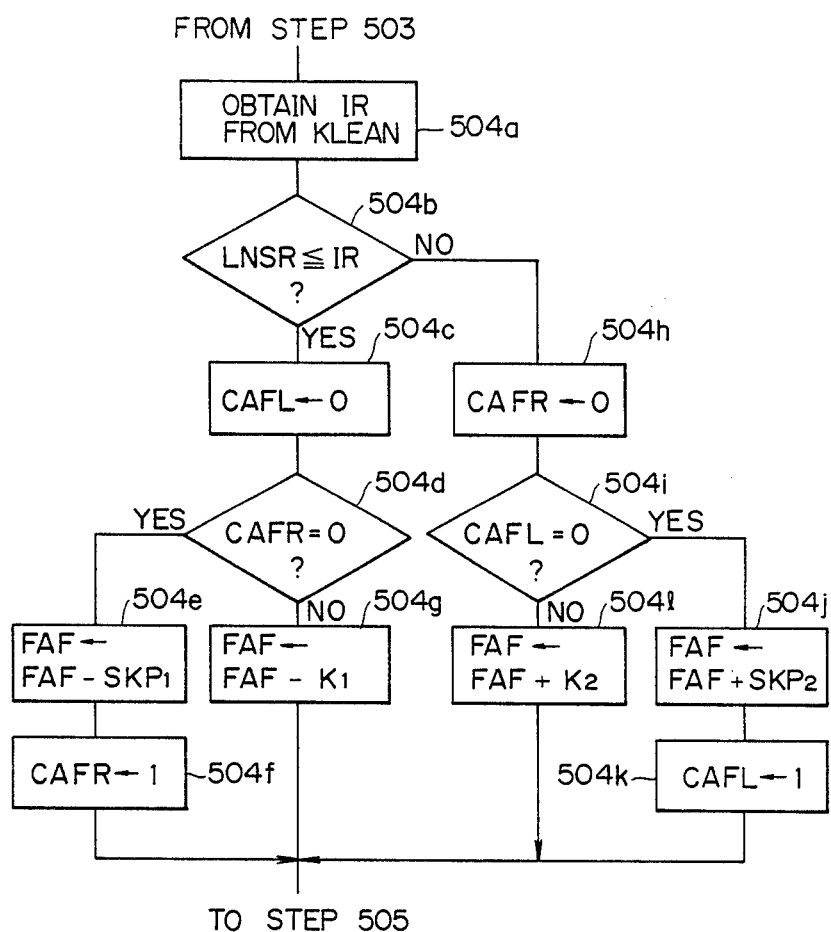
FIG. 14 is a flow chart for calculating the correction coefficient FAF.
Figure 18:
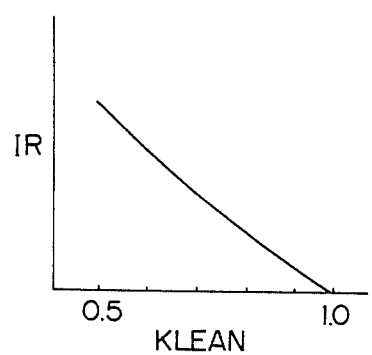
FIG. 18 is a diagram illustrating the relationship between the correction coefficient KLEAN and a reference current IR.

FIG. 14 illustrates an example of the processing executed in step 504 of FIG. 13. Referring to FIG. 14, initially, at the step 504a, a reference value IR is obtained from KLEAN. Data indicating the relationship between IR and KLEAN ad illustrated in FIG. 18 is stored in the ROM 53. IR indicates the output value of the lean sensor 43, which corresponds to the desired lean air-fuel ratio represented by KLEAN. Consequently, by comparing the reference value IR with the actual output value of the lean sensor 43, it is possible to control the actual air-fuel ratio so that it becomes equal to the desired lean air-fuel ratio.

At step 504b, the output value of the lean sensor 43 is compared with the reference value IR representing the desired lean air-fuel ratio, that is, it is determined whether the actual air-fuel ratio is on the lean side or on the rich side of the desired lean air-fuel ratio. If LNSR ≦ IR, that is, if the actual air-fuel ratio is on the rich side of the desired lean air-fuel mixture, the routine goes to step 504c. In step 504c, the flag CAFL for the skip, which is used at step 504i, is reset. Then, at step 504d, it is determined whether the flag CAFL for the skip is reset. When the actual air-fuel ratio is changed to the rich side from the lean side of the desired lean air-fuel ratio, since the flag CAFR has been reset, the routine goes to step 504e. At step 504e, FAF is reduced by $SKP_1$. Then, at step 504f, the flag CAFR is set. Consequently, when the routine goes to step 504d, it is determined that the flag CAFR is set, and thus the routine goes to step 504g. At step 504g, FAF is reduced by $K_1$. $SKP_1$ and $K_1$ have a fixed value, and the value $SKP_1$ is considerably larger than that of $K_1$. That is, $SKP_1$ is used for instantaneously reducing FAF by a large value, namely, for carrying out the skip operation of FAF when the actual air-fuel ratio is changed from the lean side to the rich side of the desired lean air-fuel ratio. Contrary to this, $K_1$ is used for gradually reducing FAF, that is, for carrying out the integrating operation of FAF after the skip operation of FAF is completed.

If LNSR > IR, that is, when the actual air-fuel ratio is changed from the rich side to the lean side of the desired lean air-fuel ratio, the processing indicated by steps 504h through 504l is executed. The processing executed in steps 504h through 504l is almost the same as the processing executed in steps 504c through 504g, except that FAF is increased by $SKP_2$ and $K_2$. Consequently, the description regarding steps 504h through 504l is omitted.

Turning to FIG. 13, after FAF is obtained in step 504, the routine goes to step 505, and the lean correction coefficient KLEAN is put into FLEAN. The routine then goes to step 506. At step 506, the actual pulse width TAU of the injection signal is calculated from the following equation by using the basic pulse width TP, the air-fuel ratio feedback correction coefficient FAF, the lean correction coefficient FLEAN, the power correction coefficient FPOWER, and the other corrections $K_1$ and $K_2$.

$$TAU = TP \cdot FAF \cdot (FLEAN + FPOWER + K_2) \cdot K_1$$

At step 507, the actual pulse width TAU is stored in the RAM 52. In the main routine processed by the sequential interruptions executed every predetermined crank angle, the injection start time and the injection stop time are obtained from the actual pulse width TAU, and the injection signal is output to the I/O port 54 between the injection start time and the injection stop time. As a result, fuel is injected from the fuel injector 24. At this time, the air-fuel ratio is controlled in such a manner that it becomes equal to the desired lean air-fuel ratio.

When it is determined in step 502 that the flag 2 is set, that is, the gear changing operation is carried out, the routine goes to step 508, and 0.15 is put into FPOWER. Then, at step 509, 1.0 is put into FAF and, then, at step 510, 1.0 is put into FLEAN. The routine then goes to step 506. At this time, TAU is represented by the following equation.

$$TAU = TP \cdot (1.15 + K_2) \cdot K_1$$

TP indicates the basic pulse width necessary for forming an approximately stoichiometric air-fuel ratio. Consequently, TAU is larger than TP, and thus a rich air-fuel fuel mixture is fed into the engine cylinders. Consequently, when the gear changing operation is carried out, the air-fuel mixture fed into the engine cylinders is changed from the lean air-fuel mixture to the rich air-fuel mixture and a rich air-fuel mixture is then fed into the engine cylinders for as long as the flag X2 is set.

Figure 15:
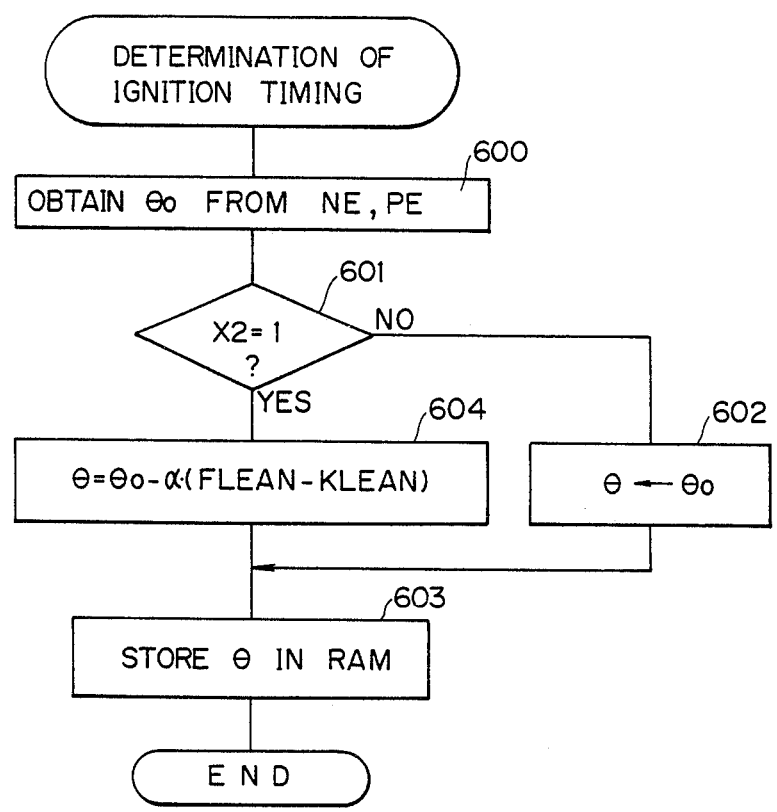
FIG. 15 is a flow chart for determining the ignition timing.

FIG. 15 illustrates a processing routine for determining the ignition timing on the basis of the flag X2. This routine is executed every time the crankshaft rotates by a predetermined angle, for example, 180 degrees. Referring to FIG. 15, initially, in step 600, the basic spark advance crank angle $\theta_0$ is obtained from the engine speed NE and the absolute pressure PM. Data indicating the relationship among the basic spark advance crank angle $\theta_0$, the engine speed NE, and the absolute pressure PM is stored in the ROM 53 in the form of a data table. Thus, at step 600, the basic spark advance crank angle $\theta_0$ is obtained from the data stored in the ROM 53. This basic spark advance crank angle indicates the most suitable ignition timing where a lean air-fuel mixture is fed into the engine cylinders.

Then, in step 601, it is determined whether the flag X2 is set, that is, the gear changing operation is carried out. If the flag X2 is reset, that is, the gear changing operation is not carried out, the routine goes to step 602. In step 602, the basic spark advance crank angle $\theta_0$ is put into the actual spark advance crank angle $\theta$. This actual spark advance crank angle $\theta$ is stored in the RAM 52 in step 603. Then, the ignition signal is fed into the ignitor 47 at a time determined by the actual spark advance crank angle $\theta$, and the corresponding spark plug 6 produces a spark.

If it is determined in step 601 that the flag X2 is set, that is, the gear changing operation is carried out, the routine goes to step 604. In step 604, the actual spark advance crank angle $\theta$ is calculated from the following equation $$\theta = \theta_0 - \alpha \cdot (FLEAN - KLEAN)$$

where, $\alpha$ is a positive fixed value.

As described above with reference to FIG. 13, when the flag X2 is set, FLEAN becomes equal to 1.0. In addition, KLEAN is smaller than 1.0. Consequently, when the flag X2 is set, that is the gear changing operation is carried out, the actual spark advance crank angle $\theta$ becomes smaller than the basic spark advance crank angle $\theta_0$ and thus the ignition timing is retarded.

According to the present invention, when the gear changing operation is carried out, a rich air-fuel mixture is fed into the engine cylinders. As a result, when the accelerator pedal is released and then depressed, since the output torque is rapidly increased, it is possible to obtain a good drivability. In addition, when the rich air-fuel mixture is fed into the engine cylinders, since the ignition timing is retarded, it is possible to prevent the occurrence of knocking.

While the invention has been described by reference to a specific embodiment chosen for purposes of illustration, it should be apparent that numerous modifications could be made thereto by those skilled in the art without departing from the basic concept and scope of the invention.

We claim:

1. A control device for an internal combustion engine having a transmission, an intake passage, an acceleration pedal, and a spark plug arranged in a combustion chamber; said device comprising:
   fuel supply means disposed in said intake passage, adapted for feeding fuel into said intake passage;
   discriminating means for discriminating whether said acceleration pedal is released and then depressed and whether a speed of said engine decreases by a predetermined amount within a predetermined time period after said acceleration pedal is depressed after said release, and for producing an output signal indicating that said acceleration pedal is released and then depressed and that the speed of said engine decreases by said predetermined amount within said predetermined time period after said acceleration pedal is depressed after said release;
   fuel supply control means, connected to said fuel supply means and controlled in response to the output signal of said discriminating means, for normally forming a lean air-fuel mixture in said intake passage and for temporarily forming a rich air-fuel mixture in said intake passage when said acceleration pedal is released and then the engine speed is decreased by said predetermined speed within said predetermined time period after said acceleration pedal is depressed after said release; and,
   ignition timing means, connected to said spark plug and controlled in response to the output signal of said discriminating means, for normally causing ignition at a predetermined basic ignition timing and for temporarily retarding the ignition timing relative to said basic ignition timing when said acceleration pedal is released and then the engine speed is decreased by said predetermined speed within said predetermined time period after said acceleration pedal is depressed after said release.

2. A control device according to claim 1, wherein said discriminating means continues to produce said output signal during a predetermined time period when the acceleration pedal is depressed after said release and said engine speed has decreased by said predetermined amount within said predetermined time period, the rich air-fuel mixture being formed in said intake passage during the time said signal is produced, the ignition timing being retarded during the time said output signal is produced.

3. A control device according to claim 2, further comprising an engine speed sensor which produces an output signal representing the engine speed, and a vacuum sensor arranged in said intake passage and producing an output signal which represents the absolute pressure in said intake passage, said discriminating means discriminating whether said acceleration pedal is released and then depressed and whether said speed of said engine decreases by said predetermined amount within said predetermined time period after said acceleration pedal is depressed after said release on the basis of the output signals of said engine speed sensor and said vacuum sensor.

4. A control device according to claim 3, wherein said discriminating means comprises:
first means for calculating the degree of change in said absolute pressure;
second means for judging whether said degree of change exceeds a predetermined upper level after said degree of change decreases below a predetermined lower level;
third means for calculating an elapsed time after said degree of change decreases below the predetermined lower level;
fourth means for judging whether said elapsed time is shorter than a predetermined time; and
fifth means for judging whether the engine speed decreases by a predetermined speed within said predetermined time, the output signal of said discriminating means being produced when said degree of change exceeds the predetermined upper level after said degree of change decreases below the predetermined lower level and when the engine speed decreases by the predetermined speed within said predetermined time, the production of the output signal of said discriminating means being stopped after said predetermined time has elapsed.

5. A control device according to claim 1, further comprising an engine speed sensor which produces an output signal representing the engine speed, and a vacuum sensor arranged in said intake passage and producing an output signal which represents the absolute pressure in said intake passage, an air-fuel ratio of said rich air-fuel mixture being determined based on the output signals of said engine speed sensor and said vacuum sensor.

6. A control device according to claim 5, further comprising a lean sensor arranged in an exhaust passage of said engine and detecting an air-fuel ratio, an air-fuel ratio of the lean air-fuel mixture being controlled in response to an output signal of said lean sensor so that it becomes equal to a desired lean air-fuel ratio.

7. A control device according to claim 1, further comprising a throttle valve arranged in said intake passage, and a throttle switch connected to said throttle valve and producing an output signal which indicates whether the degree of opening of said throttle valve is larger than a predetermined degree, said fuel supply control means being controlled in response to the output signal of said throttle switch and forming a relatively lean air-fuel mixture or an extremely lean air-fuel mixture which is leaner than said relatively lean air-fuel mixture when the degree of opening of said throttle valve is larger or smaller than said predetermined degree, respectively.

8. A control device according to claim 1, further comprising an engine speed sensor which produces an output signal representing the engine speed, and a vacuum sensor arranged in said intake passage and producing an output signal which represents the absolute pressure in said intake passage, said ignition timing control means retarding the ignition timing by a predetermined crank angle relative to said basic ignition timing which is determined by the output signals of said vehicle speed sensor and said vacuum sensor.

9. A control device according to claim 8, wherein said predetermined crank angle is determined based on a lean correction coefficient representing a desired lean air-fuel ratio and determined based on the output signals of said engine speed sensor and said vacuum sensor.

10. A control device according to claim 1, wherein said intake passage has a helically-shaped intake port comprising a helical portion, a substantially straight extending inlet passage portion tangentially connected to said helical portion, a bypass passage branches off from said inlet passage portion and connected to a helix terminating portion of said helical portion, and a swirl control valve arranged in said bypass passage.

11. A control device according to claim 10, wherein said intake port has a separating wall projecting downward from an upper wall of said intake port and extending along an axis of said intake port, said separating wall defining said helical portion, said inlet passage portion, and said bypass passage.

* * * * *

UNITED STATES PATENT AND TRADEMARK OFFICE
CERTIFICATE OF CORRECTION

PATENT NO. : 4,730,587

DATED : March 15, 1988

INVENTOR(S) : Kazuhiko NOROTA, et al.

It is certified that error appears in the above-identified patent and that said Letters Patent is hereby corrected as shown below:

Title page:

[73] Assignee: Toyota Jidosha Kabushiki Kaisha, Toyota, Japan

Signed and Sealed this

Eighteenth Day of October, 1988

Attest:

DONALD J. QUIGG

Attesting Officer

Commissioner of Patents and Trademarks